United States Patent
Murray et al.

(10) Patent No.: US 6,583,083 B2
(45) Date of Patent: Jun. 24, 2003

(54) OLEFIN POLYMERIZATION CATALYST SYSTEM

(75) Inventors: Rex E. Murray, Cross Lanes, WV (US); Simon Mawson, Charleston, WV (US)

(73) Assignee: Univation Technologies, LLC, Houston, TX (US)

(*) Notice: Subject to any disclaimer, the term of this patent is extended or adjusted under 35 U.S.C. 154(b) by 163 days.

(21) Appl. No.: 09/867,154

(22) Filed: May 29, 2001

(65) Prior Publication Data

US 2001/0031697 A1 Oct. 18, 2001

Related U.S. Application Data

(62) Division of application No. 09/216,215, filed on Dec. 18, 1998, now Pat. No. 6,303,719.

(51) Int. Cl.[7] .......................... B01J 31/00; B01J 37/00; C08F 4/02; C08F 4/60

(52) U.S. Cl. .................. 502/125; 502/127; 502/172

(58) Field of Search ............................... 502/125, 127, 502/172

(56) References Cited

U.S. PATENT DOCUMENTS

| | | | |
|---|---|---|---|
| 3,900,452 A | * 8/1975 | Valvassori et al. | 260/80.78 |
| 4,001,195 A | 1/1977 | Wyatt | 526/348 |
| 4,508,842 A | 4/1985 | Beran et al. | 502/112 |
| 4,752,597 A | 6/1988 | Turner | 502/104 |
| 4,791,180 A | 12/1988 | Turner | 526/160 |
| 4,808,561 A | 2/1989 | Welborn, Jr. | 502/104 |
| 4,845,067 A | 7/1989 | Kao et al. | 502/119 |
| 4,897,455 A | 1/1990 | Welborn, Jr. | 526/129 |
| 4,914,253 A | 4/1990 | Chang | 585/523 |
| 4,923,833 A | 5/1990 | Kioka et al. | 502/9 |
| 4,999,327 A | 3/1991 | Kao et al. | 502/119 |
| 5,008,228 A | 4/1991 | Chang | 502/111 |
| 5,026,797 A | 6/1991 | Takahashi | 526/124 |
| 5,077,255 A | 12/1991 | Welborn, Jr. | 502/104 |
| 5,086,024 A | 2/1992 | Crapo et al. | 502/117 |
| 5,086,025 A | 2/1992 | Chang | 502/117 |
| 5,106,804 A | 4/1992 | Bailly et al. | 502/108 |
| 5,122,491 A | 6/1992 | Kioka et al. | 502/117 |
| 5,147,949 A | 9/1992 | Chang | 526/129 |
| 5,155,079 A | 10/1992 | Cribbs et al. | 502/113 |
| 5,206,199 A | 4/1993 | Kioka et al. | 502/117 |
| 5,240,894 A | 8/1993 | Burkhardt et al. | 502/117 |
| 5,270,407 A | 12/1993 | Takeuchi et al. | 526/74 |
| 5,308,815 A | 5/1994 | Sangokoya | 502/104 |
| 5,318,935 A | 6/1994 | Canich et al. | 502/117 |
| 5,340,786 A | 8/1994 | Tsutsui et al. | 502/117 |

(List continued on next page.)

FOREIGN PATENT DOCUMENTS

| | | |
|---|---|---|
| EP | 0 619 325 A1 | 10/1994 |
| EP | 0803520 B1 | 12/1998 |
| GB | 1015054 | 12/1965 |
| WO | WO 96/33202 | 10/1996 |
| WO | WO 97/02298 | 1/1997 |
| WO | WO 98/49208 | 11/1998 |
| WO | WO 99/01460 | 1/1999 |

OTHER PUBLICATIONS

Kempe et al., Octahedral Group 4 Metal Complexes . . . , Inorg. Chem. 1996, 35, 6742–6745, 1996.*
Gibson, Vernon C. et al: "Synthesis and structural characterisation of aluminum imino–amide and pyridyl–amide complexes: bulky monoanionic N,N chelate ligands via methyl group transfer", Journal of Organaometallic Chemistry, CH, Elsevier–Sequoia S.A. Lausanne, vol. 550, No. 1–2, Jan. 15, 1998, pp. 453–456.
*Inorg. Chem.*, Fuhrman et al., 1996, 35, 6742–6745.
*J. Organometallic Chem.*, Gibson et al., 550 (1998) 453–456.
*J. Organometallic Chem.*, Orrell et al., 555 (1998) 35–47.

Primary Examiner—Mark L. Bell
Assistant Examiner—J. Pasterczyk
(74) Attorney, Agent, or Firm—Jaimes Sher; Lisa Kimes Jones; Kevin M. Faulkner

(57) ABSTRACT

This invention relates to an olefin polymerization catalyst composition comprising the product of the combination of an activator, an additive and a transition metal compound which is represented by the formula:

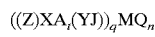

$$((Z)XA_t(YJ))_q MQ_n$$

where M is a metal selected from the group consisting of Groups 3 to 13, lanthanide and actinide metals of the Periodic Table of Elements; Q is bonded to M and each Q is a monovalent, divalent or trivalent anion; X and Y are bonded to M; X and Y are independently selected from the group consisting of nitrogen, oxygen, sulfur and phosphorous; Y is contained in a heterocyclic ring J, where J comprises from 2 to 50 non-hydrogen atoms, Z is bonded to X, where Z comprises 1 to 50 non-hydrogen atoms; t is 0 to 1; when t is 1, A is a bridging group joined to at least one of X, Y or J, q is 1 or 2; n is the oxidation state of M minus q minus 1 if Q is a monovalent anion, n is (the oxidation state of M−q)/2 if Q is a bivalent anion, or n is (the oxidation state of M−q)/3 if Q is a trivalent anion, optionally a group $R'_m$ may be bound to Z and/or a group $R''_p$ may be bound to J;

the R" groups are independently selected from the group consisting of hydrogen, linear, branched, and cyclic alkyl, alkenyl, alkynyl, alkoxy, aryl and aryloxy radicals; two or more R" groups may be joined to form a cyclic moiety; m is an integer from 0 to 5;

the R' groups are independently selected from the group consisting of hydrogen, linear, branched, and cyclic alkyl, alkenyl, alkynyl, alkoxy, aryl and aryloxy radicals; two or more R' groups may be joined to form a cyclic moiety; p is an integer from 0 to 5;

and wherein the additive is a carbonyl compound.

14 Claims, No Drawings

U.S. PATENT DOCUMENTS

| | | | |
|---|---|---|---|
| 5,405,922 A | 4/1995 | DeChellis et al. | 526/68 |
| 5,420,220 A | 5/1995 | Cheruvu et al. | 526/348 |
| 5,422,325 A | 6/1995 | Jejelowo et al. | 502/104 |
| 5,434,116 A | 7/1995 | Sone et al. | 502/103 |
| 5,466,649 A | 11/1995 | Jejelowo | 502/120 |
| 5,473,028 A | 12/1995 | Nowlin et al. | 526/114 |
| 5,516,737 A | 5/1996 | Jejelowo | 502/104 |
| 5,516,861 A | 5/1996 | Jejelowo | 526/126 |
| 5,554,704 A | 9/1996 | Burkhardt et al. | 526/153 |
| 5,578,537 A | 11/1996 | Herrmann et al. | 502/120 |
| 5,587,501 A | 12/1996 | Winter et al. | 556/53 |
| 5,595,950 A | 1/1997 | Sagar et al. | 502/104 |
| 5,599,885 A | 2/1997 | Kawasaki et al. | 526/68 |
| 5,602,217 A | 2/1997 | Jejelowo | 526/129 |
| 5,637,660 A | 6/1997 | Nagy et al. | 526/160 |
| 5,684,098 A | 11/1997 | Wang et al. | 526/133 |
| 5,714,427 A | 2/1998 | Winter et al. | 502/117 |
| 5,723,705 A | 3/1998 | Herrmann et al. | 585/9 |
| 5,726,115 A | 3/1998 | Horton et al. | 502/152 |
| 5,753,578 A | 5/1998 | Santi et al. | 502/114 |
| 5,814,574 A | 9/1998 | McNally | 502/103 |
| 6,117,959 A * | 9/2000 | Ponasik, Jr. et al. | 526/172 |
| 6,303,719 B1 * | 10/2001 | Murray et al. | 526/161 |

\* cited by examiner

US 6,583,083 B2

OLEFIN POLYMERIZATION CATALYST SYSTEM

RELATED APPLICATION DATA

This application is a Divisional of U.S. patent application Ser. No. 09/216,215, filed Dec. 18, 1998 now issued as U.S. Pat. No. 6,303,719.

FIELD OF THE INVENTION

This invention relates to olefin polymerization catalysts based upon transition metal compounds comprising bidentate ligands containing pyridine or quinoline moieties combined with activators and an additive.

BACKGROUND OF THE INVENTION

The intense commercialization of metallocene polyolefin catalysts has led to widespread interest in the design of non-metallocene, homogeneous catalysts. This field is more than an academic curiosity as new, non-metallocene catalysts may provide an easier pathway to currently available products and may also provide product and process opportunities which are beyond the capability of metallocene catalysts. In addition, certain non-cyclopentadienyl ligands may be more economical due to the relative ease of synthesis of a variety of substituted analogs.

Thus there is a need in the art for new novel olefin polymerization catalysts. U.S. Ser. No. 09/103,620 discloses the use of transition metal compounds comprising bidentate ligands containing pyridine or quinoline moieties and mixtures thereof with activators to polymerize olefins. In particular [[1-(2-Pyridyl)N-1-Methylethyl]-[1-N-2,6-Diisopropylphenyl Amido]][2-Methyl-1-Phenyl-2-Propoxy] Zirconium Dibenzyl is combined with modified methyl alumoxane in the gas phase to produce ethylene hexene copolymers.

We have found that the systems in U.S. Ser. No. 09/103,620 can be modified by the direct addition of an additive to produce bimodal products from a single catalyst.

For US purposes the following references are mentioned: U.S. Pat. No. 4,845,067; U.S. Pat. No. 4,999,327; JP 1126111; U.S. Pat. No. 4,508,842; and UK 1015054.

SUMMARY OF THE INVENTION

This invention relates to an olefin polymerization catalyst system comprising the product of the combination of an activator, an additive and a transition metal compound based on bidentate ligands containing pyridine or quinoline moieties, such as those described in U.S. application Ser. No. 09/103,620 filed Jun. 23, 1998, which is herein incorporated by reference. This invention further relates to a process to produce polyolefins using such catalysts. This invention further relates to resins produced by such catalyst system, preferably polyethylene resins, more preferably bimodal high density polyethylene resins.

DETAILED DESCRIPTION OF THE INVENTION

This invention relates to olefin polymerization catalyst system comprising an activator, an additive and a transition metal compound based on bidentate ligands containing pyridine or quinoline moieties.

The activator may be any known catalyst activator and in one embodiment is an alkyl aluminum, an alumoxane, a modified alumoxane, a polyalumoxane, a non-coordinating anion, a Lewis acid or a mixture thereof.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference.

Ionizing compounds (non-coordinating anions) may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference. Other activators include those described in PCT publication WO 98/07515 such as tris (2,2',2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

The additive may be a carbonyl compound. Carbonyl compounds are defined to be compounds represented by the formula R=O where R is a $C_1$ to $C_{100}$ group and oxygen may be bound at any point along the R group. The R group may also contain heteroatoms, in addition to the 1 to 100 carbon atoms. Preferred carbonyl compounds include ketones and aldehydes. Particularly preferred carbonyl compounds include acetone, benzophenone, methyl ethyl ketone, diethyl ketone, methyl isobutyl ketone, methyl isopropyl ketone, diisopropyl ketone, methyl tertiary butyl ketone, acetophenone, cyclohexanone, cyclopentanone, benzaldehyde, pivaldehyde, ethyl n-propyl ketone, ethyl isopropyl ketone, and the like.

In one embodiment, the transition metal catalyst compound based on bidentate ligands containing pyridine or quinoline moieties is represented by the formula:

$$((Z)XA_t(YJ))_q MQ_n \qquad (I)$$

where M is a metal selected from Group 3 to 13 or lanthanide and actinide series of the Periodic Table of Elements; Q is bonded to M and each Q is a monovalent, divalent or trivalent anion; X and Y are bonded to M; X and Y are independently carbon or a heteroatom, provided that at least one of X and Y is a heteroatom, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms or a silyl group, an alkyl silyl group such as a trialkyl silyl, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is the oxidation state of M minus q if Q is a monovalent anion, n is (the oxidation state of M−q)/2, if Q is a bivalent anion or n is (the oxidation state of M−q)/3 if Q is a trivalent anion, typically n is an integer from 1 to 4 depending on the oxidation state of M. In one embodiment, if X is oxygen or sulfur then Z is optional. In another embodiment, if X is nitrogen or phosphorous then Z is present. In an embodiment, Z is preferably an aryl group, more preferably a substituted aryl group.

In another embodiment, R'm is bound to Z and R"p is bound to J, the R" groups are independently selected from the group consisting of hydrogen or linear, branched, cyclic, alkyl radicals, or alkenyl, alkynyl, alkoxy, aryl or aryloxy radicals. Also, two or more R" groups may be joined to form a cyclic moiety such as an aliphatic or aromatic ring. Preferably R" is hydrogen or an aryl group, most preferably R" is hydrogen. When R" is an aryl group and Y is nitrogen, a quinoline group is formed. Optionally, an R" may be joined to A; m is an integer from 0 to 5, preferably 2;

the R' groups are independently selected from group consisting of hydrogen or linear, branched, alkyl radicals or cyclic alkyl, alkenyl, alkynyl or aryl radicals. Also, two or more R' groups may be joined to form a cyclic moiety such as an aliphatic or aromatic ring. Preferably R' is an alkyl group having from 1 to 20 carbon atoms, more preferably R' is methyl, ethyl, propyl, butyl, pentyl and the like, including isomers thereof, more preferably R' is a methyl group, or a primary, secondary or tertiary hydrocarbon, including isopropyl, t-butyl and the like, most preferably R' is an isopropyl group. Optionally, an R' group may be joined to A. It is preferred that at least one R' is ortho to X; p is an integer from 0 to 5, preferably 2.

In a preferred embodiment M is a Group 4 to 12 transition metal, more preferably a Group 4, 5 or 6 transition metal, even more preferably a Group 4 transition metal such as titanium, zirconium or hafnium, and most preferably zirconium.

In a preferred embodiment each Q is independently selected from the group consisting of halogens, hydrogen, alkyl, aryl, alkenyl, alkylaryl, arylalkyl, hydrocarboxy or phenoxy radicals having 1–20 carbon atoms. Each Q may also be amides, phosphides, sulfides, silylalkyls, diketonates, and carboxylates. Optionally, each Q may contain one or more heteroatoms, more preferably each Q is selected from the group consisting of halides, alkyl radicals and arylalkyl radicals. Most preferably, each Q is selected from the group consisting of arylalkyl radicals such as benzyl.

In a preferred embodiment, X and Y are independently selected from the group consisting of nitrogen, oxygen, sulfur and phosphorous, even more preferably nitrogen or phosphorous, and most preferably nitrogen.

J contains preferably from 2 to 7 carbon atoms, more preferably from 3 to 6 carbon atoms, and most preferably 5 carbon atoms. Optionally, the heterocyclic ring J containing Y, may contain additional heteroatoms.

Z is preferably a hydrocarbyl group bonded to X preferably Z is a hydrocarbyl group of from 1 to 50 carbon atoms, preferably Z is a cyclic group having from 3 to 30 carbon atoms, preferably Z is a substituted or unsubstituted cyclic group containing from 3 to 30 carbon atoms, optionally including one or more heteroatoms, more preferably Z is an aryl group, most preferably a substituted aryl group in another embodiment Z may be silyl or an alkyl silyl, preferably a trialkyl silyl.

A is preferably a bridging group containing one or more Group 13 to 16 elements from the Periodic Table of Elements. More preferably A contains one or more Group 14 elements, most preferably A is a substituted carbon group, a di-substituted carbon group or vinyl group.

In a preferred embodiment Q is not a hydrocarboxy or phenoxy radicals.

In one embodiment J is pyridine in any of the above formulae.

The transition metal compounds may be made by any means in the art.

In a preferred embodiment the additive is combined with the transition metal catalyst compound in an amount of 0.5 weight % to about 90 weight % based upon the weight of the transition metal catalyst compound and the additive, but not any activators or supports, preferably 1 weight % to about 80 weight %, more preferably 10 to 60 weight %.

The additive may be combined with the transition metal catalyst compound (with or without the activator) before being added to the polymerization reactor. In one embodiment the additive is added to the transition metal catalyst compound in line in the injection tube.

In a preferred embodiment the activator is allowed to react with the transition metal catalyst compound (that has already bee reacted with the additive) for at least 5 minutes before being combined with the olefin, preferably 10 minutes, more preferably 15 minutes. It has been noted that if the transition metal catalyst compound is simply combined with the additive then added directly to the reactor, that less bimodal product is obtained. If the additive and the transition metal compound are allowed to react then for a period of time then more bimodal product is obtained.

In another preferred embodiment the activator and the transition metal catalyst compound are combined in a ratio of 0.5 to 1 to 10,000 to 1, more preferably 1 to 1 to 1000 to 1, more preferably 100 to 1 to 500 to 1.

In a preferred embodiment the additive and the transition metal catalyst compound are combined prior to being combined with the activator. In a alternative embodiment the transition metal catalyst, olefin and the activator are already present in the polymerization reactor and the additive is added. In embodiments where the additive is to be added after the activator and the transition metal catalyst compound are already combined and the activator is alumoxane, then extra amounts of additive may be required.

Different additives may be used to achieve different effects on the polymer produced. For example using diethyl ketone as the additive produces a polymer having a higher molecular weight than does using methyl ethyl ketone as the additive. Likewise using methyl ethyl ketone as the additive produces a polymer having a higher molecular weight than using acetone as the additive does.

In a preferred embodiment the transition metal catalyst compound, [1-(2-Pyridyl)N-1-Methylethyl][1-N-2,6-Diisopropylphenyl Amido] Zirconium Tribenzyl and the additive acetone are used in combination with an alumoxane, preferably a methyl alumoxane, more preferably a modified methyl alumoxane in a gas phase or slurry reactor to produce polyethylene, preferably high density polyethylene. In another preferred embodiment a non-coordinating anion, such as tri (n-butyl) ammonium tetrakis (pentafluorophenyl) boron or a trisperfluorophenyl boron, is used in combination with the transition metal catalyst compound, [1-(2-Pyridyl)N-1-Methylethyl][1-N-2,6-Diisopropylphenyl Amido] Zirconium Tribenzyl and acetone, in a gas phase or slurry phase reactor.

The additive may or may not be present when the activator is added to the transition metal compound before or after being placed in the reactor.

Likewise the transition metal catalyst compound, the activators, or components thereof may be supported on an organic or inorganic support. Typically the support can be of any of the solid, porous supports. Typical support materials include talc; inorganic oxides such as silica, magnesium chloride, alumina, silica-alumina; polymeric supports such as polyethylene, polypropylene, polystyrene; and the like. Preferred supports include silica, clay, talc magnesium chloride and the like. Preferably the support is used in finely divided form. Prior to use the support is preferably partially or completely dehydrated. The dehydration may be done physically by calcining or by chemically converting all or part of the active hydroxyls. For more information on how to support catalysts please see U.S. Pat. No. 4,808,561 which teaches how to support a metallocene catalyst system. The techniques used therein are generally applicable for this invention. In one embodiment the transition metal compound is placed upon a support then the additive is added and allowed to react for at least 10 minutes, thereafter the activator is added combined with the supported transition metal compound.

The transition metal catalyst compound and/or the activator may be placed on separate supports or may be placed on the same support and thereafter treated with the activator. The catalysts/catalyst systems and/or their components need not be feed into the reactor in the same manner. For example, one catalyst or its components may slurried into the reactor on a support while the other catalyst or components are provided in a solution.

In another preferred embodiment two different transition metal compounds are used in combination with an activator and an additive in the same reactor.

In another embodiment two reactors are used in series and a different transition metal catalyst compound is placed in each with the same or different activators and an additive is added to at least one reactor.

In a preferred embodiment the catalyst system is fed into the reactor in a solution or slurry. Hydrocarbons are useful for the solutions or slurries. For example the solution can be toluene, hexane, isopentane or a combination thereof such as toluene and isopentane or toluene and pentane. A typical solution would be 0.02 to 0.05 mole catalyst in the hydrocarbon carrier, preferably isopentane or hexane.

In another embodiment the carrier for the catalyst system or its components is a super critical fluid, such as ethane or propane. For more information on supercritical fluids as catalyst feed agents see EP 0 764 665 A2.

In another preferred embodiment the one or all of the catalysts are combined with up to 6 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. These agents may be dry tumbled with the catalyst or may be fed into the reactor in a solution with or without the catalyst system or its components. In a preferred embodiment the catalysts combined with the activators are tumbled with 1 weight % of aluminum distearate and/or 2 weight % of an antistat, such as a methoxylated amine, such as Witco's Kemamine AS-990 from ICI Specialties in Bloomington Del. The metal stearate and/or the anti-static agent may be slurried into the reactor in mineral oil or ground into a powder then suspended in mineral oil then fed into the reactor, or blown directly into the reactor as a powder.

More information on using aluminum stearate type additives may be found in U.S. Ser. No. 09/113,216 filed Jul. 10, 1998, which is incorporated by reference herein.

In another embodiment the transition metal catalyst compound and activator are fed into the reactor separately from the additive.

Without wishing to be bound by any theory, is appears that the additive reacts with the transition metal catalyst compound to provide another active catalyst species.

In embodiments of the invention, it has been noted that temperature affects the balance between the two forms of the catalyst. It seems that higher temperatures drive the conversion of the transition metal catalyst compound in the presence of the additive to the second catalyst species. Thus by selecting the amount of additive and the temperature at which they are combined and/or used one can select for desired end products.

Polymerization Process of the Invention

The catalysts and catalyst systems described above are suitable for use a solution, gas or slurry polymerization process or a combination thereof, most preferably a gas or slurry phase polymerization process.

In one embodiment, this invention is directed toward the solution, slurry or gas phase polymerization reactions involving the polymerization of one or more of monomers having from 2 to 30 carbon atoms, preferably 2–12 carbon atoms, and more preferably 2 to 8 carbon atoms. Preferred monomers include one or more of ethylene, propylene, butene-1, pentene-1, 4-methyl-pentene-1, hexene-1, octene-1, decene-1, 3-methyl-pentene-1, and cyclic olefins or a combination thereof Other monomers can include vinyl monomers, diolefins such as dienes, polyenes, norbornene, norbornadiene monomers. Preferably a homopolymer of ethylene is produced. In another embodiment, a copolymer of ethylene and one or more of the monomers listed above is produced.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1,3-methyl-pentene-1, hexene-1 and octene-1, the most preferred being hexene-1 and butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The productivity of the catalyst or catalyst system in a gas phase system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent. Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

The proportions of the components of the feed catalyst solution can be varied to alter molecular weight and other properties. Another method to alter the molecular weight is to add hydrogen to the system by increasing the hydrogen ethylene ratio. A method to control the density is altering the comonomer content.

A method to control molecular weight distribution (Mw/Mn), flow index, and/or density comprising altering on line in a commercial scale gas phase reactor (i.e. having a volume of 1500 cubic feet or more) the reaction temp and/or the catalyst ratio in the intimately mixed catalyst solution and/or the hydrogen concentration and/or the activator to transition metal ratio, such as the aluminum/zirconium ratio is also provided herein.

Injection and mixing temperatures also provide a means to alter product properties as temperature affects activation and/or solvent evaporation and thus alters the catalyst composition and hence alters the final product.

The sequence and timing of activation also provides an opportunity to alter the catalyst composition and thus the final product. For example higher concentrations of methyl alumoxane in a system comprising (A). [1-(2-Pyridyl)N-1-Methylethyl][1-N-2,6-Diisopropylphenyl Amido] Zirconium Tribenzyl will alter the balance of Mw species formed by the catalyst. This includes higher concentrations during activation and/or mixing and/or transport and/or in spraying into the reactor. Likewise we have noted that increasing the hydrocarbon carrier in the catalyst feed increased the amount of lower molecular weight fraction produced.

One can also vary the product by altering the reaction temperature. We have noted that raising the reaction temperature increased the amount of the higher molecular weight component and unusually the two modes in the size exclusion chromatography graph moved closer together (that is the Mw/Mn became lower when compared to the same system at a lower temperature).

One can also vary the molecular weight distribution by varying the reactor temperature, varying the temperature of the catalyst system before it enters the reactor, varying the catalyst to activator ratio, varying the volume of the carrier, and/or contacting the transition metal component with solvent prior to activation with the activator. in another preferred embodiment the catalyst system in is liquid form and is introduced into the reactor into a resin particle lean zone. For information on how to introduce a liquid catalyst system into a fluidized bed polymerization into a particle lean zone, please see U.S. Pat. No. 5,693,727, which is incorporated by reference herein.

In a preferred embodiment, the polyolefin recovered typically has a melt index as measured by ASTM D-1238, Condition E, at 190° C. of 1 g/10 min or less. In a preferred embodiment the polyolefin is ethylene homopolymer or copolymer. The comonomer is preferably a C3 to C20 linear branched or cyclic monomer, and in one embodiment is a C3 to C12 linear or branched alpha-olefin, preferably propylene, hexene, pentene, hexene, heptene, octene, nonene, decene, dodecene, 4-methyl-pentene-1, 3-methyl pentene-1,3,5,5-trimethyl hexene 1, and the like.

In a preferred embodiment the catalyst system described above is used to make a high density polyethylene having a density of between 0.925 and 0.0950 g/cm$^3$ (as measured by ASTM 2839), a melt index of 1.0 or less g/10 min or less (as measured by ASTM D-1238, Condition E, at 190° C.).

In another preferred embodiment the polyolefin produced has a polydispersity (Mw/Mn) of greater than 5, preferably greater than 7, preferably greater than 9, preferably greater than 12.

In another preferred embodiment the polyolefin produced is bimodal. By bimodal is meant that the GPC graph of the polymer molecular weight distribution shows two peaks, or a peak with a hump. Alternately, the polymer is found to have at least two species of molecular weights present at greater than 20 weight % based upon the weight of the polymer.

The polyolefins then can be made into films, molded articles, sheets and the like. The films may be formed by any of the conventional technique known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, BaSO$_4$, diatomaceous earth, wax, carbon black, flame retarding additives, low molecular weight resins, glass beads and the like. The additives may be present in the typically effective amounts well known in the art, such as 0.001 weight % to 10 weight %.

EXAMPLES

MFR Melt Flow Ratio was measured by ASTM 1238.

BBF (butyl branch frequency per 1000 carbon atoms) was measured by infrared spectroscopy as describe in U.S. Pat. No. 5,527,752.

PDI (polydispersity index) is Mw/Mn and was measured by Size Exclusion Chromotography.

Melt Index (N) was measured by the procedure according to ASTM 1238, condition E.

Melt Index Ratio (MIR) is the ratio of $I_{21}$ over $I_2$ as measured by the procedure according to ASTM D 1238.

Density is measured according to ASTM D 1505.

MMAO 3A is modified methyl alumoxane commercially available from Akzo Chemicals, Inc. under the trade name Modified Methylalumoxane type 3A, covered under patent number U.S. Pat. No. 5,041,584)

Example 1

Preparation of [1-(2-Pyridyl)N-1-Methylethyl][1-N-2,6-Diisopropylphenvl]Amine

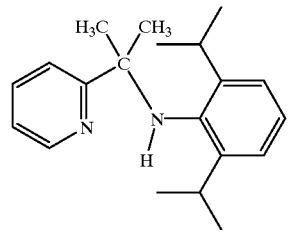

In a dry box, 22.45 mmol (6.34 g) 2-acetylpyridine (2,6-diisopropylphenylimine) were charged to a 250 ml round bottom flask equipped with a stir bar and septa. The flask was sealed, removed from the dry box and placed under nitrogen purge. Dry toluene (50 ml) was added and stirred to dissolve the ligand. The vessel was chilled to 0° C. in a wet ice bath. Trimethyl aluminum (Aldrich, 2.0 M in toluene) was added dropwise over ten minutes. The temperature of the reaction was not allowed to exceed 10° C. When addition of the trimethyl aluminum was complete, the mixture was allowed to warm slowly to room temperature, and then was then placed in an oil bath and heated to 40° C. for 25 minutes. The vessel was removed from the oil bath and placed in an ice bath. A dropping funnel containing 100 ml of 5% KOH was attached to the flask. The caustic was charged to the reaction dropwise over a 1 hour span. The mixture was transferred to a separatory funnel. The aqueous layer was removed. The solvent layer was washed with 100 ml water then 100 ml brine. The red-brown liquid product was dried over Na$_2$SO$_4$, vacuum stripped and placed under high vacuum over night.

80 ml of red-brown liquid was transferred to a 200 ml Schlenk flask equipped with a stir bar. A distillation head with a dry ice condenser was attached to the flask. The mixture was vacuum distilled yielding approximately 70 g of dark yellow viscous liquid product.

Example 2

Preparation of [1-(2-Pyridyl)N-1-Methylethyl][1-N-2,6-Diisopropylphenyl Amido] Zirconium Tribenzyl

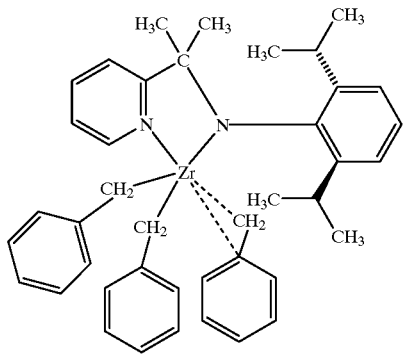

In a darkened room and darkened dry box, 5.0 mmol (1.45 g) of the ligand made in Example 1 were charged to a 100 ml Schlenk tube equipped with a stir bar. The ligand was dissolved in 5 ml of toluene. To a second vessel equipped with a stir bar was charged 5.5 mmol (2.5 g) tetrabenzyl zirconium and 10 ml toluene.

The ligand solution was transferred into the tetrabenzyl zirconium solution. The vessel was covered with foil and allowed to stir at room temperature in the dry box. After 6 hours at room temperature 80 ml dry hexane was added to the reaction solution and allowed to stir overnight. The reaction mixture was filtered through a medium porosity frit with approximately 2 g pale yellow solids collected.

Example 3

In a dry box, MMAO type 3A (5.8 mLs, 10 mmoles, 1.74M, 6.42 wt % in heptane) was charged to an oven dried, 4 dram glass vial. 2-methyl-1-phenyl-2-propanol (15.5 μLs, 0.1 mmoles) was added to the MMAO dropwise while stirring resulting in a clear solution.

In a dry box, toluene (0.1 mLs, alumina dried) was charged to an oven dried, 4 dram glass vial. The complex prepared in Example 2 (0.5 μmoles, 6.3 microliters of an 0.080M solution in toluene) was added to the 1-hexene resulting in a pale yellow solution. The MMAO/2-methyl-1-phenyl-2-propanol solution prepared in the paragraph above (0.25 mmoles, 0.13 mL) was then added to the vial resulting in pale yellow reaction solution. The vial was heated in an oil bath at 50° C. for 5 minutes resulting in a reddish brown reaction solution.

The reaction solution was charged to a 1-L slurry reactor containing 600 mLs n-hexane, 43 mLs 1-hexene, and 0.13 mLs (0.25 mmoles) MMAO/2-methyl-1-phenyl-2-propanol solution, and run at 85° C. and 85 psi ethylene for 30 minutes. The reaction produced 16.3 g of polyethylene resin (activity=76706 g polyethylene/mmole Zr/hour/100 psi ethylene, I2=0.069, I21=2.15, MFR=31.1, BBF=7.71). Size Exclusion Chromatography (SEC) revealed the following molecular weight properties: Mn=54,637, Mw=292,411, PDI=5.35.

Example 4

In a dry box, MMAO type 3A (5.8 mLs, 10 mmoles, 1.74M, 6.42 wt % in heptane) was charged to an oven dried, 4 dram glass vial. 2-methyl-1-phenyl-2-propanol (15.5 μLs, 0.1 mmoles) was added to the MMAO dropwise while stirring resulting in a clear solution.

In a dry box, toluene (0.1 mLs, alumina dried) was charged to an oven dried, 4 dram glass vial. The complex prepared in Example 2 (0.5 μmoles, 6.3 microliters of an 0.080M solution in toluene) was added to the toluene resulting in a pale yellow solution. The MMAO/2-methyl-1-phenyl-2-propanol solution prepared in the paragraph above (0.25 mmoles, 0.13 mL) was then added to the vial resulting in pale yellow reaction solution. The vial was heated in an oil bath at 50° C. for 15 minutes resulting in a reddish brown reaction solution.

The reaction solution was charged to a 1-L slurry reactor containing 600 mLs n-hexane, 43 mLs 1-hexene, and 0.13 mLs (0.25 mmoles) MMAO/2-methyl-1-phenyl-2-propanol solution, and run at 85° C. and 85 psi ethylene for 30 minutes. The reaction produced 13.2 g of polyethylene resin (activity=62118 g polyethylene/mmole Zr/hour/100 psi ethylene, I2=0.248, I21=7.85, MFR=31.6, BBF=6.30). Size Exclusion Chromatography (SEC) revealed the following molecular weight properties: Mn=42,411, Mw=205,990, PDI=4.86.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. An olefin polymerization catalyst composition comprising the product of the combination of an activator, an additive and a transition metal compound which is represented by the formula:

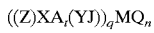

where M is a metal selected from the group consisting of Groups 3 to 13, lanthanide and actinide metals of the Periodic Table of Elements; Q is bonded to M and each Q is a monovalent, divalent or trivalent anion; X and Y are bonded to M; X and Y are independently selected from the group consisting of nitrogen, oxygen, sulfur and phosphorous; Y is contained in a heterocyclic ring J, where J comprises from 2 to 50 non-hydrogen atoms, Z is bonded to X, where Z comprises 1 to 50 non-hydrogen atoms; t is 0 to 1; when t is 1, A is a bridging group joined to at least one of X, Y or J, q is 1 or 2; n is the oxidation state of M minus q minus 1 if Q is a monovalent anion, n is (the oxidation state of M−q)/2 if Q is a bivalent anion, or n is (the oxidation state of M−q)/3 if Q is a trivalent anion, optionally a group R'$_m$ may be bound to Z and/or a group R"$_p$ may be bound to J;

the R" groups are independently selected from the group consisting of hydrogen, linear, branched, and cyclic alkyl, alkenyl, alkynyl, alkoxy, aryl and aryloxy radicals; two or more R" groups may be joined to form a cyclic moiety; m is an integer from 0 to 5;

the R' groups are independently selected from the group consisting of hydrogen, linear, branched, and cyclic alkyl, alkenyl, alkynyl, alkoxy, aryl and aryloxy radicals; two or more R' groups may be joined to form a cyclic moiety; p is an integer from 0 to 5;

and wherein the additive is a carbonyl compound.

2. The composition of claim 1, wherein the carbonyl compound is one or more of acetone, benzophenone, methyl ethyl ketone, diethyl ketone, methyl isobutyl ketone, methyl isopropyl ketone, diisopropyl ketone, methyl tertiary butyl ketone, acetophenone, cyclohexanone, cyclopentanone, benzaldehyde, pivaldehyde, ethyl n-propyl ketone, or ethyl isopropyl ketone.

3. The composition of claim 1 wherein M is titanium, zirconium or hafnium.

4. The composition of claim 1 wherein each Q is independently selected from the group consisting of halogens, hydrogen, alkyl, aryl, alkenyl, alkylaryl, arylalkyl, hydrocarboxy or phenoxy radicals having 1–20 carbon atoms, amides, phosphides, sulfides, silylalkyls, diketonates, and carboxylates.

5. The composition of claim 1 wherein X and Y are nitrogen.

6. The composition of claim 1 wherein Z is an aryl group.

7. The composition of claim 1 wherein J is a pyridyl group.

8. The composition of claim 1 wherein the transition metal compound is [1-(2-Pyridyl)N-1-Methylethyl][1-N-2,6-Diisopropylphenyl Amido] Zirconium Tribenzyl.

9. The composition of claim 1 wherein the activator is an alumoxane.

10. The composition of claim 1 wherein the activator is a non-coordinating anion.

11. The composition of claim 8 wherein the activator is an alumoxane.

12. The composition of claim 8 wherein the activator is a modified methyl alumoxane.

13. The composition of claim 1 further comprising a metal stearate.

14. The composition of claim 1 further comprising aluminum distearate.

* * * * *